United States Patent [19]

Iga

[11] Patent Number: 5,570,371
[45] Date of Patent: Oct. 29, 1996

[54] PATH TRACE BYTE COLLECTING CIRCUIT FOR SYNCHRONOUS OPTICAL NETWORKS

[75] Inventor: Naoto Iga, Tokyo, Japan

[73] Assignee: NEC Corporation, Japan

[21] Appl. No.: 456,171

[22] Filed: May 31, 1995

[30] Foreign Application Priority Data

Jun. 1, 1994 [JP] Japan ..................... 6-119929

[51] Int. Cl.6 .................. H04J 3/26; H04Q 1/39
[52] U.S. Cl. ........................... 370/99; 370/110.1
[58] Field of Search ..................... 370/99, 110.1, 370/100.1, 105.1, 102, 112, 111, 14, 13; 375/208, 209, 210, 367, 368

[56] References Cited

U.S. PATENT DOCUMENTS

| | | | |
|---|---|---|---|
| 4,852,128 | 7/1989 | Lill | 375/117 |
| 5,025,459 | 6/1991 | Lill | 375/117 |
| 5,163,072 | 11/1992 | Lill | 375/117 |
| 5,185,736 | 2/1993 | Tyrrell et al. | 370/55 |
| 5,257,261 | 10/1993 | Parruck et al. | 370/84 |
| 5,369,653 | 11/1994 | Kuroda | 371/67.1 |
| 5,375,070 | 12/1994 | Hershey et al. | 364/550 |
| 5,390,180 | 2/1995 | Reilly | 370/84 |
| 5,394,442 | 2/1995 | Lill | 375/369 |

*Primary Examiner*—Douglas W. Olms
*Assistant Examiner*—Matthew Phillips
*Attorney, Agent, or Firm*—Scully, Scott, Murphy & Presser

[57] ABSTRACT

A J1 byte processing circuit is provided with a J1 byte latch pulse sampling circuit, which samples in preset periods a J1 byte latch pulse. The sampling circuit generates, in accordance with the sampled J1 byte latch pulse, a data acquisition request to instruct acquisition of a J1 byte from the path overhead of an SPE level signal of STS-1 with the J1 byte latch pulse sampled by the sampling circuit, and sends it to a microcomputer interface. The microcomputer acquires into it the J1 byte from the J1 latching section in accordance with the data acquisition request. This configuration reduces the processing load on the microcomputer, and thereby enables the microcomputer to execute other processes even during the collection of J1 bytes.

5 Claims, 4 Drawing Sheets

FIG.4A STS-1 SPE Signal 101
FIG.4B Latch Pulse 102
FIG.4C Sampled Latch Pulse 111
FIG.4D Data Request Signal 112

PATH TRACE BYTE COLLECTING CIRCUIT FOR SYNCHRONOUS OPTICAL NETWORKS

BACKGROUND OF THE INVENTION

The present invention relates to a path trace byte collecting circuit, and more particularly to a collection system for synchronous transport signal (STS) path trace bytes (J1 bytes) in Synchronous Optical NETworks (SONET).

As will be stated later, STS path trace bytes (hereinafter referred to as J1 bytes) are added to the path overhead, and one such byte is transmitted every 125 μsec. Each set of J1 bytes consists of 64 bytes, which constitute the unit of repeated transmission. Furthermore, the J1 bytes are repeatedly transmitted in a fixed value to be used for confirmation of continue connection with the other party to communication, and the fixed value can be freely set by the user. STS-1 of SONET is described in detail in "Synchronous Optical Network (SONET) Transport Systems: Common Generic Criteria", Bellcore, Technical Advisory TA-NWT-000253 Issue 8, October 1993.

SUMMARY OF THE INVENTION

An object of the invention is to provide a novel collecting circuit for J1 bytes referred to above.

A path trace byte collecting circuit according to the invention is provided with a sampling circuit for sampling a latch pulse for latching path trace bytes in prescribed periods, and an instructing circuit for instructing the collection of the path trace bytes at the sampling timing of the sampling circuit.

A path trace byte collecting circuit according to the invention may also be provided, in addition to the above-described configuration, with a latching circuit for latching the path trace bytes at the sampling timing of the sampling circuit.

A path trace byte collecting circuit according to the invention comprises a sampling circuit for sampling a latch pulse for latching J1 bytes in periods of (64×n +1) times each (n is a positive integer), and acquisition request generating means for generating and supplying a request to acquire the J1 bytes at the sampling timing of the sampling circuit.

According to the invention, a microcomputer sets the optimal sampling period, in which a J1 byte latch pulse is sampled. The J1 bytes from SPE level signals of STS-1 is latched by the sampled J1 byte latch pulse latches and sends them to the microcomputer.

A data acquisition request is generated at the timing of the sampled J1 byte latch pulse, and supplied to the microcomputer, which acquires the latched J1 bytes into it on the basis of the data acquisition request.

In this way, the intervals of data acquisition requests to the microcomputer are elongated to reduce the processing load on the microcomputer and enables it to execute other processes even during the collection of J1 bytes.

BRIEF DESCRIPTION OF THE DRAWINGS

The above-mentioned and other objects, features and advantages of the present invention will become more apparent from the following detailed description when taken in conjunction with the accompanying drawings, wherein:

FIGS. 4A to 4E are time charts for describing the operation of the circuit of FIG. 3.

DETAILED DESCRIPTION OF THE PREFERRED EMBODIMENT

Figure 1:
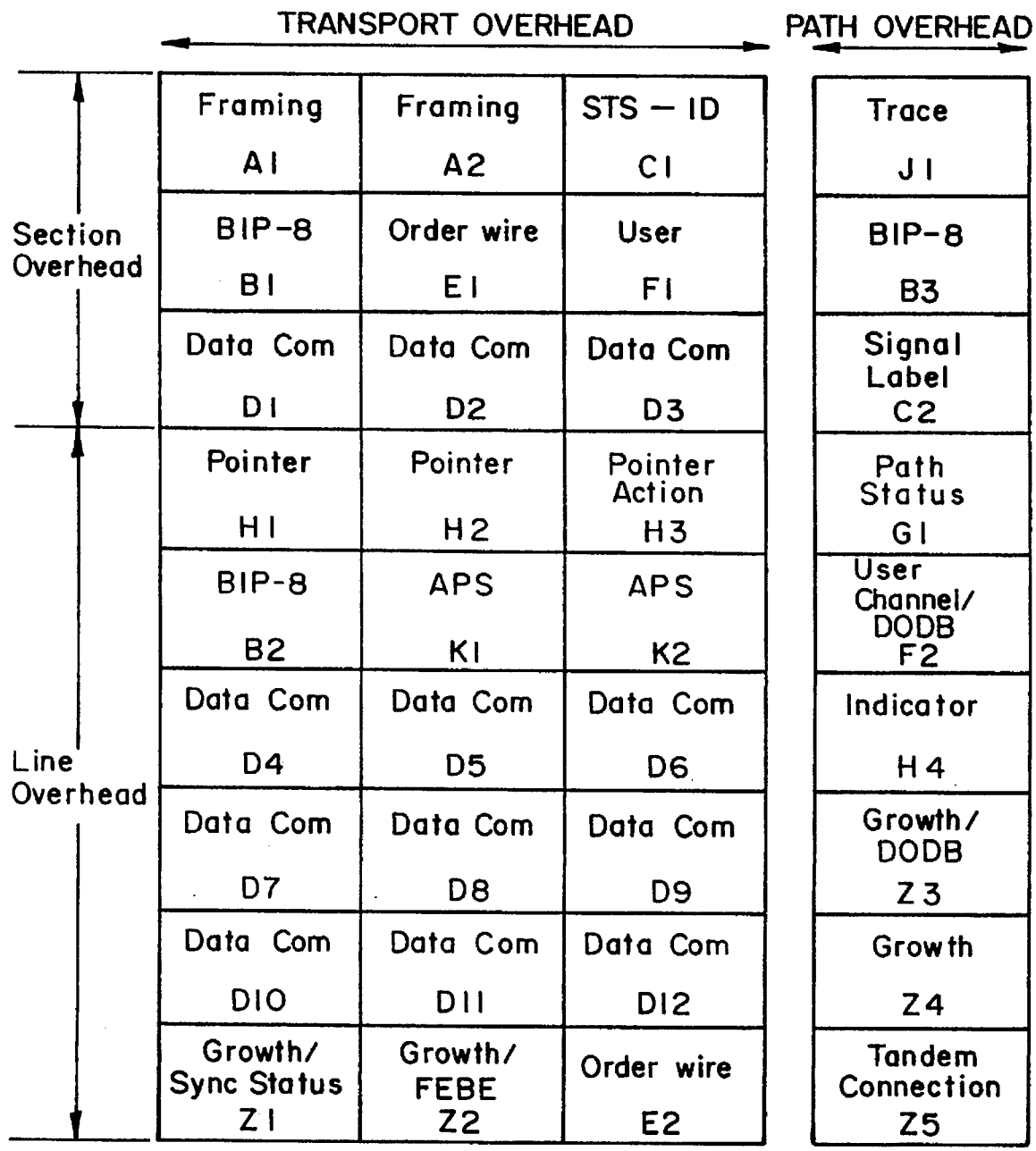
FIG. 1 is a diagram showing the format of overheads of STS-1.

Referring to FIG. 1, overheads of STS-1 in SONET comprises a transport overhead having a section overhead and a line overhead, and a path overhead. An STS path trace byte is added to the path overhead, and transmitted every 125 μsec. Sets of J1 bytes, each having 64 bytes, are repeatedly transmitted in such 64-byte units. Furthermore, the J1 bytes are repeatedly transmitted in a fixed value to be used for confirmation of continue connection with the other party to communication, and the fixed value can be freely set by the user.

Figure 2:
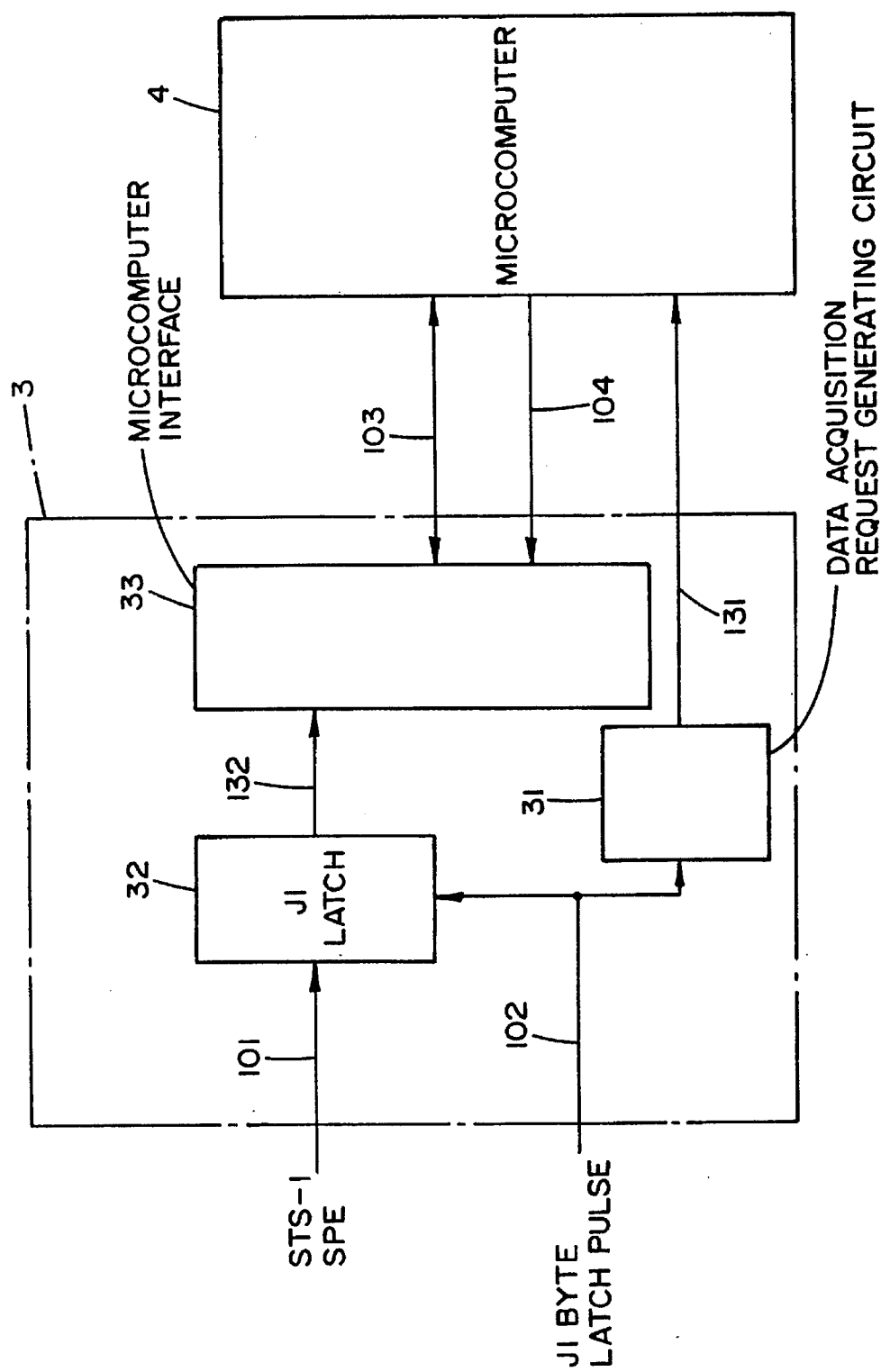
FIG. 2 is a block diagram of a J1 byte collecting circuit for describing the problems to be solved by the invention.

Referring now to FIG. 2, a J1 byte processing circuit 3 for collecting J1 bytes under study includes a data acquisition request generating section 31, a J1 latching circuit 32 and a microcomputer interface 33. This J1 byte processing circuit 3 is connected to a microcomputer 4 via the interface 33, a data bus 103 and an address bus 104. The J1 latching circuit 32 latches a J1 byte from the path overhead (POH) of an synchronous payload envelope (SPE) level signal 101 of STS-1 with a J1 byte latch pulse 102, which is transmitted every 125 μsec, and sends that J1 byte to the interface 33. The J1 byte is generated in accordance with the STS signal that is entered. The data acquisition request generating section 31 generates a data acquisition request to instruct acquisition of the J1 byte in accordance with the J1 byte latch pulse 102, and supplies that data acquisition request 131 to the microcomputer 4.

Upon receiving the data acquisition request 131 from the data acquisition request generating section 31, the microcomputer 4 acquires into it the J1 byte 132 from the J1 latching section 32 via the interface 33, the data bus 103 and the address bus 104.

The J1 byte collecting system described above generates and supplies to the microcomputer a data acquisition request at the timing of the high-frequency J1 byte latch pulse transmitted every 125 μsec. It has been revealed that, as a result, interrupt processing occurs at a high frequency in the microcomputer, which is therefore subjected to heavy load and made unable to execute any other process.

Figure 3:
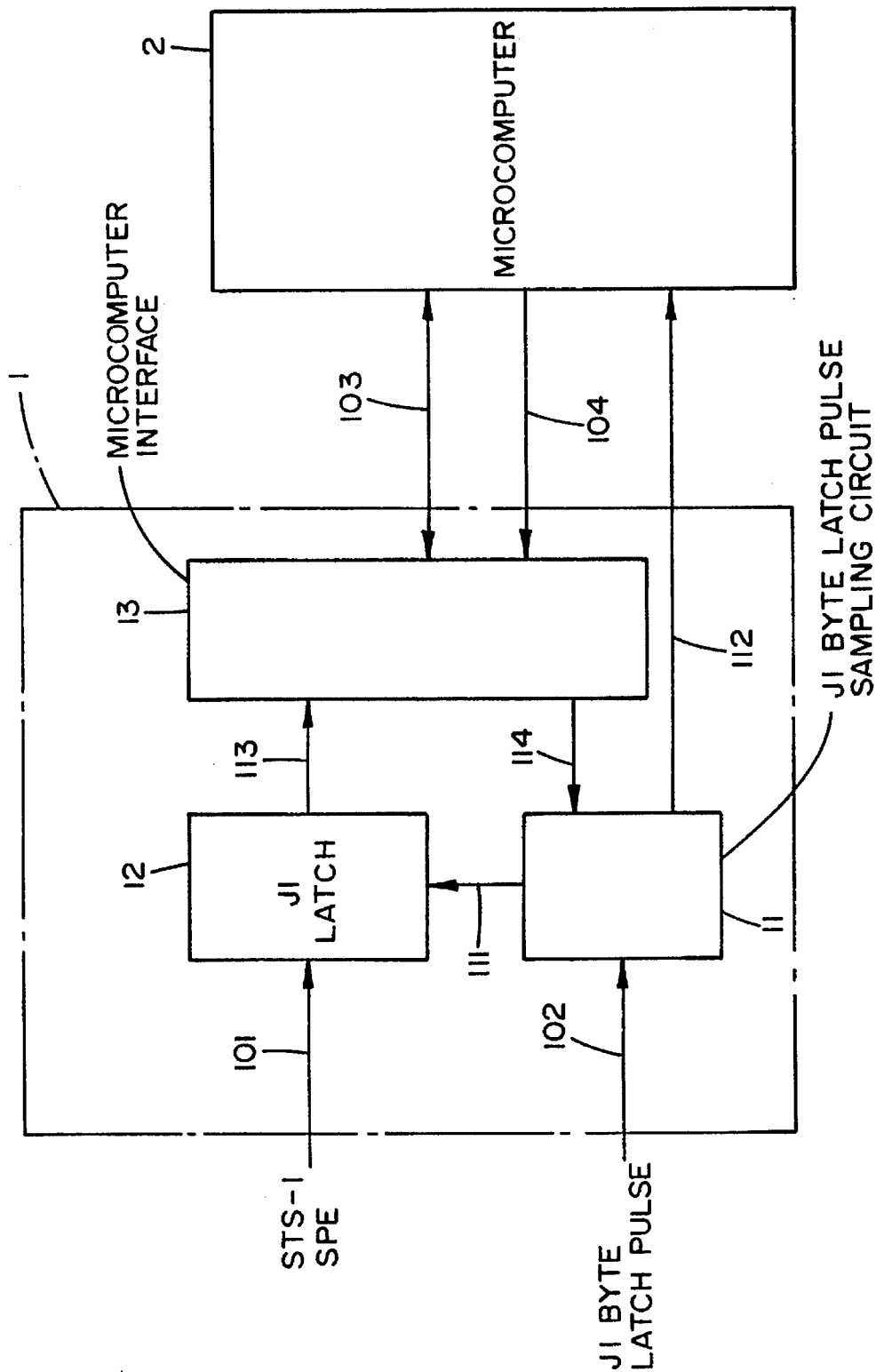
FIG. 3 is a block diagram illustrating a preferred embodiment of the invention.

Referring to FIG. 3, a J1 byte processing circuit 1, which is a preferred embodiment of the present invention, comprises a J1 byte latch pulse sampling circuit 11, a J1 latching circuit 12 and a microcomputer interface 13. This J1 byte processing circuit 1 is connected to a microcomputer 2 via the interface 13, a data bus 103 and an address bus 104.

The sampling circuit 11 samples, in a sampling period 114 set by the microcomputer 2, a J1 byte latch pulse 102 transmitted every 125 μsec, and supplies the sampled J1 byte latch pulse 111 to the J1 latching circuit 12. The sampling circuit 11 generates, in accordance with the sampled J1 byte latch pulse, a data acquisition request 112 to instruct acquisition of a J1 byte, and supplies that data acquisition request 112 to the microcomputer 2. The J1 latching circuit 12 latches the J1 byte from the POH of an SPE level signal 101 of STS-1 with the J1 byte latch pulse 111 sampled by the sampling circuit 11, and sends that J1 byte 113 to the interface 13. Upon receiving the data acquisition request 112 from the data acquisition request generating section 11, the microcomputer 2 acquires into it the J1 byte 113 from the J1 latching section 12 via the interface 13, the data bus 103 and the address bus 104.

In this case, as the microcomputer 2 acquires into it the J1 bytes in the sequence of their configuration (in the ascending order), these J1 bytes are successively held inside. Upon acquiring the final one of the J1 bytes, the microcomputer 2 rearranges the J1 bytes held within.

FIGS. 4A to 4E are time charts for describing the operation of the J1 byte collecting circuit of FIG. 3. The charts show the operation in a case where the J1 byte latch pulse 102 is sampled once every 65 inputs of the latch pulse. The operation of the preferred embodiment of the invention will be described with reference to these charts and FIG. 3 together.

The microcomputer 2 sets a sampling frequency 114 in the sampling circuit 11 via the data bus 103, the address bus 104 and the interface 13. In this case, the microcomputer 2 sets the optimal sampling frequency at once every 65 inputs of the J1 byte latch pulse (FIG. 4B).

Figure 4E:
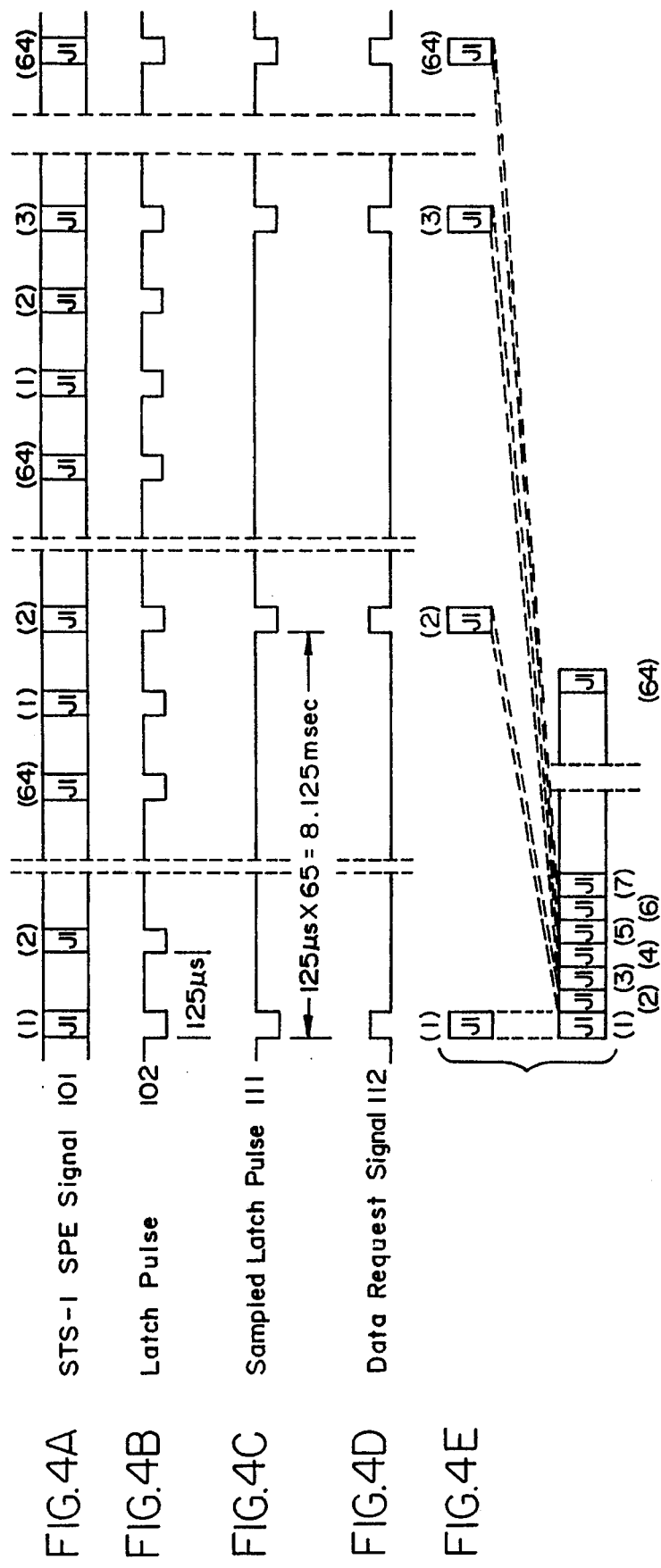

The J1 byte processing circuit 1 samples, at a frequency of once every 65 inputs, the J1 byte latch pulse 102, which is transmitted at 125 μsec intervals (FIG. 4C). The J1 latching circuit 12 latches the J1 byte from the overhead of the SPE level signal 101 of STS-1 (FIG. 4A) with the J1 byte latch pulse 111 from the sampling circuit 11, and sends that J1 byte 113 to the interface 13. The sampling circuit 11 generates a data acquisition request at the timing of the sampled J1 byte latch pulse 111, and supplies that data acquisition request (FIG. 4D) to the microcomputer 2. Upon receiving the data acquisition request 112 from the sampling circuit 11, the microcomputer 2 acquires into it the J1 byte from the J1 latching circuit 12 via the interface 13, the data bus 103 and the address bus 104 (FIG. 4E). As a result, after the first one "J1 (1)" of the J1 bytes is acquired into the microcomputer 2, the second one "J1 (2)" of the J1 bytes is acquired into the microcomputer 2 at the timing of the 65th input of the J1 byte latch pulse 102. Furthermore, the second one "J1 (2)" through the 64th one "J1 (64)" of the J1 bytes are successively acquired into the microcomputer 2 at the timing of the 65th input of the J1 byte latch pulse 102 after the acquisition of the respectively preceding bytes (the first byte "J1 (1)" through the 63rd byte "J1 (63) "). Therefore, by sequentially rearranging the first one "J1 (1)" through the 64th one "J1 (64)" of J1 bytes after the 64th J1 byte "J1 (64)" is acquired, the 64 J1 bytes can be obtained. Since, in this case, the microcomputer 2 acquires a J1 byte every 125 μsec×65 =8.125 msec, the processing load on the microcomputer 2 can be reduced, enabling it to execute other processes even during the collection of J1 bytes.

Although the foregoing description referred to a case in which the optimal sampling frequency was set at once every 65 inputs of the J1 byte latch pulse 102, it is also possible to set it at once every (64 ×n +1) inputs (n is a positive integer, more particularly not smaller than 2) of the J1 byte latch pulse 102.

Thus the frequency of data acquisition requests to the microcomputer 2 can be reduced by having the microcomputer 2 set the optimal sampling frequency in the sampling circuit 11 and sampling the J1 byte latch pulse 102 at its optimal frequency to latch J1 bytes and issue data acquisition requests to the microcomputer 2 at that timing, and accordingly the processing load on the microcomputer 2 can be alleviated. Therefore, the microcomputer 2 can execute other processes even during the collection of J1 bytes.

What is claimed is:

1. A path trace byte collecting circuit comprising:

sampling means for sampling a latch pulse at a predetermined sampling period, and for supplying the sampled latch pulse to a latching means for latching path trace bytes that are periodically embedded in an input signal, and instructing means for instructing a collecting means to collect the latched path trace bytes at said predetermined sampling period.

2. A path trace byte collecting circuit, as claimed in claim 1, wherein said predetermined sampling period is one latch pulse period longer than a period defined by said latch pulse period multiplied by a number of said path trace bytes contained in a full set of said path trace bytes.

3. A path trace byte collecting circuit, as claimed in claim 1, wherein said instructing means instructs the collection of said latched path trace bytes in a sequential order defined by a sequence in which said path trace bytes are embedded in said input signal.

4. A path trace byte collecting circuit for collecting 64 J1 bytes sequentially embedded in an STS signal, comprising:

sampling means for sampling a latch pulse and for supplying the sampled latch pulse to a latching means for latching said J1 bytes at a sampling rate of every (64×n+1) latch pulses, where n is a positive integer, and acquisition request generating means for generating and supplying a request to acquire said J1 bytes at the sampling rate of said sampling means.

5. A path trace byte collecting circuit, as claimed in claims 4, wherein said acquisition request generating means generates said acquisition request so as to collect said J1 bytes at said sampling rate and in a sequential order defined by said embedded sequence of said J1 bytes in said STS sign.

* * * * *

UNITED STATES PATENT AND TRADEMARK OFFICE
CERTIFICATE OF CORRECTION

PATENT NO. : 5,570,371
DATED : October 29, 1997
INVENTOR(S) : Naoto Iga

It is certified that error appears in the above-indentified patent and that said Letters Patent is hereby corrected as shown below:

Column 4, line 50, Claim 5: "sign"
should read --signal--

Signed and Sealed this

Twenty-ninth Day of July, 1997

Attest:

BRUCE LEHMAN

Attesting Officer

Commissioner of Patents and Trademarks